United States Patent
Koch et al.

(10) Patent No.: US 8,864,104 B2
(45) Date of Patent: Oct. 21, 2014

(54) APPARATUS FOR MOUNTING PROCESS CONTROL DEVICES TO ACTUATORS

(75) Inventors: Ben Koch, Marshalltown, IA (US); Brian Burlage, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 802 days.

(21) Appl. No.: 12/388,290

(22) Filed: Feb. 18, 2009

(65) Prior Publication Data

US 2010/0207045 A1    Aug. 19, 2010

(51) Int. Cl.
F16K 31/00    (2006.01)
F16K 37/00    (2006.01)

(52) U.S. Cl.
CPC .................................. *F16K 37/00* (2013.01)
USPC ................... 251/291; 248/316.4; 248/231.41

(58) Field of Classification Search
USPC ........ 248/316.4, 228.3, 230.3, 231.41, 219.1, 248/219.3, 219.4, 218.4, 228.5, 231.61; 24/455, 526, 531, 539, 558; 269/2, 86, 269/91, 97, 101, 105, 104, 126, 156, 189, 269/244, 246, 250, 252, 253, 262, 265, 269/269; 251/291, 292, 366

See application file for complete search history.

(56) References Cited

U.S. PATENT DOCUMENTS

| | | | | |
|---|---|---|---|---|
| 1,466,925 A | * | 9/1923 | Biggs et al. | 191/40 |
| 1,974,628 A | * | 9/1934 | Donald | 248/228.3 |
| 3,053,494 A | * | 9/1962 | Stoll | 248/228.3 |
| 3,606,217 A | * | 9/1971 | Leiferman | |
| 4,846,431 A | * | 7/1989 | Pflieger | 248/228.4 |

(Continued)

FOREIGN PATENT DOCUMENTS

| | | |
|---|---|---|
| DE | 19949781 | 5/2001 |
| GB | 702384 | 1/1954 |

(Continued)

OTHER PUBLICATIONS

Siemens AG, "Siemens Sipart® PS 6DR3000-1N/E-2N/E," pp. 30-40, 1991 (11 pages).

(Continued)

*Primary Examiner* — Alfred J Wujciak
(74) *Attorney, Agent, or Firm* — Hanley, Flight & Zimmerman, LLC.

(57) ABSTRACT

Apparatus to mount process control devices to actuators are described. An example includes a mounting plate having a first side to receive the process control device and a second side opposite the first side, where the second side includes a first clamping finger extending away from the second side and configured to engage a first edge of an actuator yoke. The example apparatus also includes an elongated clamp arm having second and third clamping fingers adjacent respective ends of the elongated clamp arm, where each of the second and third clamping fingers is configured to engage a second edge of the actuator yoke opposite the first edge, and where the elongated clamp arm is slidably coupled to the mounting plate. Additionally, the example apparatus includes a fastener adjustable to cause the elongated clamp arm and the mounting plate to slide toward each other so that the first, second and third clamping fingers engage the respective edges of the yoke to fix the mounting plate relative to the yoke.

27 Claims, 6 Drawing Sheets

(56) References Cited

U.S. PATENT DOCUMENTS

| | | | |
|---|---|---|---|
| 4,860,985 A * | 8/1989 | Olson et al. | 248/229.17 |
| 4,993,670 A * | 2/1991 | Tesar | 248/68.1 |
| 5,193,774 A * | 3/1993 | Rogers | 248/219.4 |
| 5,228,739 A * | 7/1993 | Love | 296/100.02 |
| 5,278,530 A | 1/1994 | Zovath | |
| 5,822,918 A * | 10/1998 | Helfman et al. | 47/39 |
| 6,283,425 B1 * | 9/2001 | Liljevik | 248/230.4 |
| 6,336,616 B1 * | 1/2002 | Lin | 248/222.11 |
| 6,378,821 B1 * | 4/2002 | McKelvy et al. | 248/218.4 |
| 6,494,642 B1 * | 12/2002 | Daly | 405/36 |
| 6,561,473 B1 * | 5/2003 | Ianello | 248/219.4 |
| 6,768,474 B2 * | 7/2004 | Hunt | 343/892 |
| 6,908,068 B2 * | 6/2005 | Fortino et al. | 251/59 |
| 7,113,145 B1 * | 9/2006 | Noble | 343/892 |
| 7,866,616 B2 * | 1/2011 | Wen et al. | 248/219.4 |
| 2002/0162924 A1 * | 11/2002 | Herzog | 248/218.4 |
| 2011/0083399 A1 * | 4/2011 | Lettkeman et al. | 52/745.21 |

FOREIGN PATENT DOCUMENTS

| | | |
|---|---|---|
| GB | 971254 | 9/1964 |
| JP | 5421900 | 2/1979 |
| WO | 9308580 | 4/1993 |
| WO | 2004072475 | 8/2004 |

OTHER PUBLICATIONS

Flowserve Corporation, "Logix 500 Digital Positioner," Installation, Operation, Maintenance Instructions of Valtek Control Products, 2000 (20 pages).

International Searching Authority, "International Search Report," issued in connection with international application serial No. PCT/US2010/021394, mailed May 18, 2010, 5 pages.

International Searching Authority, "Written Opinion of the International Searching Authority," issued in connection with international application serial No. PCT/US2010/021394, mailed May 18, 2010, 5 pages.

State Intellectual Property Office of P.R. China, "First Office Action," English translation, issued in connection with Chinese application serial No. 201080008215.8, issued Oct. 23, 2012, 10 pages.

The Federal Institue of Industrial Property, "Inquiry Under the Substantive Examination," issued in connection with Russian Patent Application No. 2011137321/12(055646), on Dec. 27, 2012, 6 pages.

The State Intellectual Property Office of the People's Republic of China, "The Second Office Action," issued in connection with Chinese Patent Application No. 201080008215.8, mailed on Jun. 13, 2013, 10 pages.

* cited by examiner

APPARATUS FOR MOUNTING PROCESS CONTROL DEVICES TO ACTUATORS

FIELD OF THE DISCLOSURE

The present disclosure relates generally to actuators and, more particularly, apparatus to mount process control devices to actuators.

BACKGROUND

Valves are commonly used in process control systems to manipulate a flow of fluid. The operation of the valves is typically controlled, at least in part, via a process control device such as, for example, a positioner operatively coupled to an actuator (e.g., a sliding stem actuator) that is mechanically coupled to the valve. In some cases, valve actuators may provide special mounting holes, plates, or the like that are, for example, integral to or attached to the actuator yoke of the actuator to enable the positioner or other process control device(s) to be mounted to the valve/actuator assembly. However, in many cases, a valve/actuator assembly may not provide suitable built-in attachment features to enable one or more different types of process control devices to be easily mounted to the valve/actuator assembly. In those cases, a relatively complex arrangement of U-bolts, J-hooks, plates, etc. are typically used to mount the process control device(s) to the valve/actuator assembly. However, those complex mounting arrangements are difficult and time consuming to use and, as a result, can be expensive to install and/or remove.

SUMMARY

An example apparatus to mount a process control device to an actuator yoke includes a mounting plate having a first side to receive the process control device and a second side opposite the first side, where the second side includes a first clamping finger extending away from the second side and configured to engage a first edge of the actuator yoke. The example apparatus may also include an elongated clamp arm having second and third clamping fingers adjacent respective ends of the elongated clamp arm, where each of the second and third clamping fingers is configured to engage a second edge of the actuator yoke opposite the first edge, and where the elongated clamp arm is slidably coupled to the mounting plate. Additionally, the example apparatus may include a fastener adjustable to cause the elongated clamp arm and the mounting plate to slide toward each other so that the first, second and third clamping fingers engage the respective edges of the yoke to fix the mounting plate relative to the yoke.

Another example apparatus to mount a device to an actuator includes a mounting plate having a first side to receive the device and a first lug extending away from a surface of the mounting plate, where the first lug is configured to engage a first surface of an elongated support member of the actuator. The example apparatus to mount the device may also include a clamp arm slidably coupled to the mounting plate and having at least a second lug extending away from a body of the clamp arm and the surface of the mounting plate, where the second lug is configured to engage a second surface of the elongated support member opposite the first surface to fix the clamp arm and the mounting plate to the actuator.

Another example apparatus to mount a device to an actuator yoke includes means for mountably receiving the device, where the means for mountably receiving comprises means for engaging a first edge of the actuator yoke. The example apparatus may also include means for engaging a second edge of the actuator yoke opposite the first edge and means for adjustably moving the means for mountably receiving the device and the means for engaging the second edge toward each other to fix the means for mountably receiving the device relative to the actuator yoke.

DETAILED DESCRIPTION

In general, the example apparatus described herein may be used to couple or mount process control devices to actuators. More specifically, the example apparatus described herein can be easily clamped to, for example, the yoke or elongated support member (e.g., a support rod) of an actuator such as a sliding stem actuator to facilitate the mounting of one or more different types of process control devices to the actuator. Such process control devices may include positioners, volume boosters, etc. Known apparatus to mount process control devices to actuators typically employ a relatively complex arrangement of multiple threaded U-bolts, J-hooks, or the like and, thus, typically require a significant amount of installation labor. In contrast, the example apparatus described herein uses opposed sliding jaws or clamps that can be relatively quickly securely attached to and/or removed from an actuator yoke or elongated support member via a single fastener such as a threaded bolt or the like.

Figure 1:
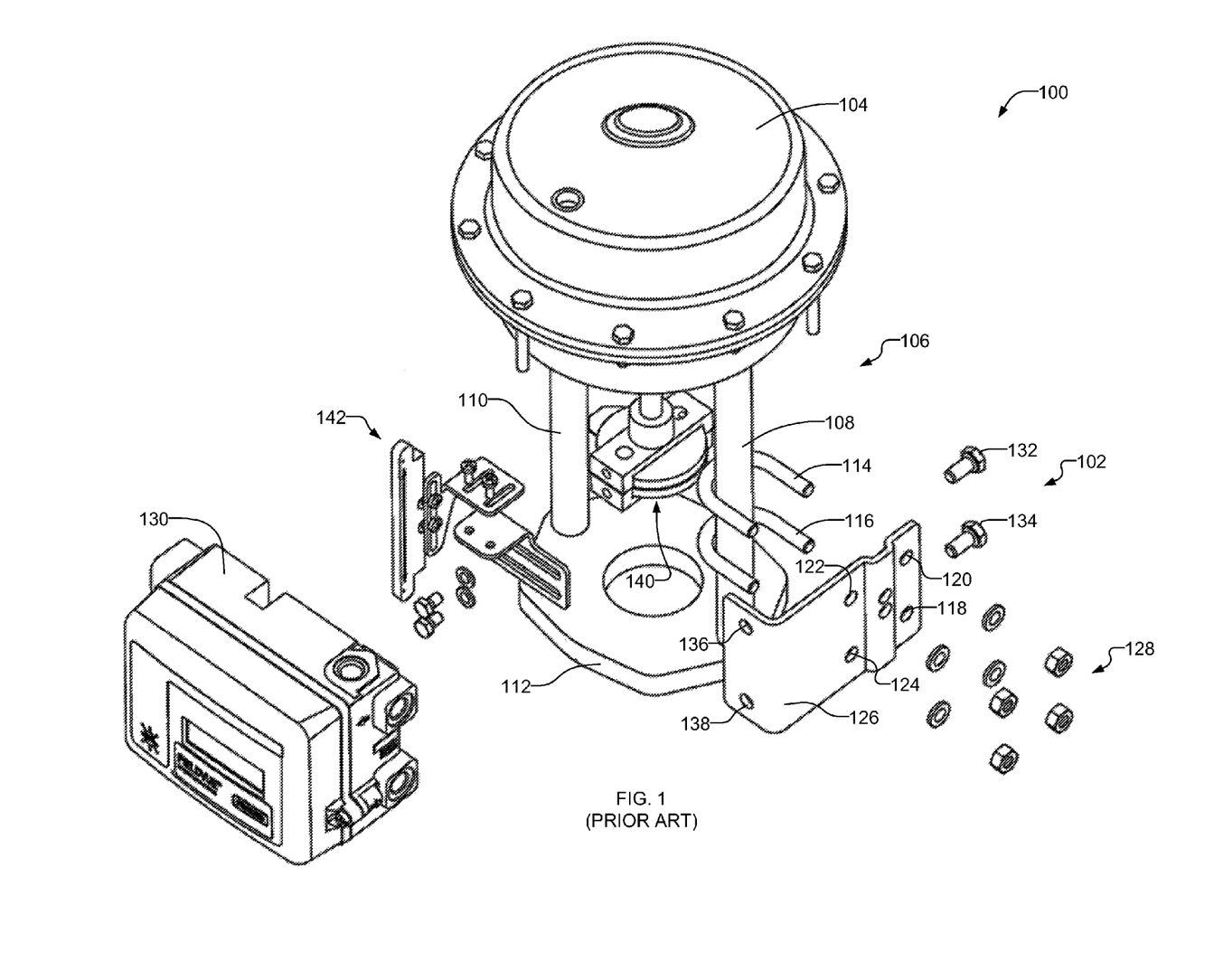
FIG. 1 illustrates an exploded assembly view of a known actuator and mounting bracket assembly.

Before describing the example apparatus to mount process control devices to actuators in detail, a brief description of a known actuator 100 and mounting bracket assembly 102 is provided below in connection with FIG. 1. As depicted in FIG. 1, the actuator assembly 100 includes a power unit 104, which is depicted as a pneumatic device, and a yoke assembly 106. The yoke assembly 106 includes elongated support members or legs 108 and 110, which are coupled to a plate 112. The mounting bracket assembly 102 is fixed or coupled to the elongated support member or leg 108 via bolts 114 and 116, which have threaded ends that pass through apertures 118, 120, 122 and 124 of bracket 126, and which are fixed to the plate via fasteners (e.g., threaded nuts) and washers 128. In the depicted example, the bolts 114 and 116 are U-bolts. However, other types of fasteners such as J-hooks may be used instead.

A process control device 130 (e.g., a positioner) is fixed to the bracket 126 via fasteners 132 and 134, which pass through apertures 136 and 138 into the device 130, thereby fixing the device 130 relative to the elongated support member or leg 108. The device 130 may also be operatively coupled to an actuator shaft assembly 140 via a feedback assembly 142 to provide shaft position information to the device 130.

As can be appreciated from the depiction of the known mounting bracket assembly 102 of FIG. 1, a relatively large number of piece parts are needed to fix the device 130 to the actuator assembly 100. Such a large number of piece parts results in a significant amount of assembly labor and costs.

Figure 2:
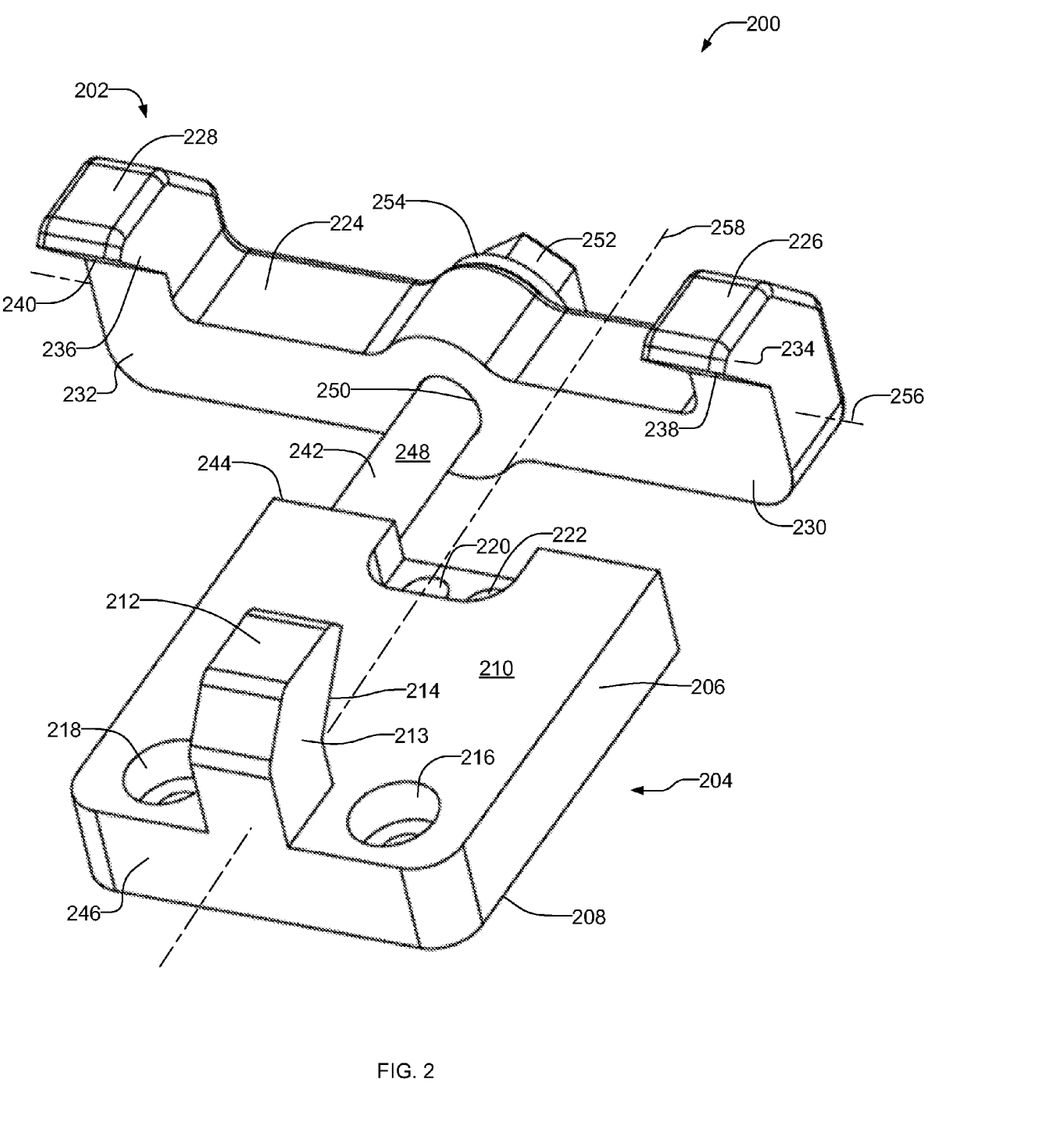
FIG. 2 is an isometric view of an example apparatus to mount process control devices to an actuator described herein.
Figure 3:
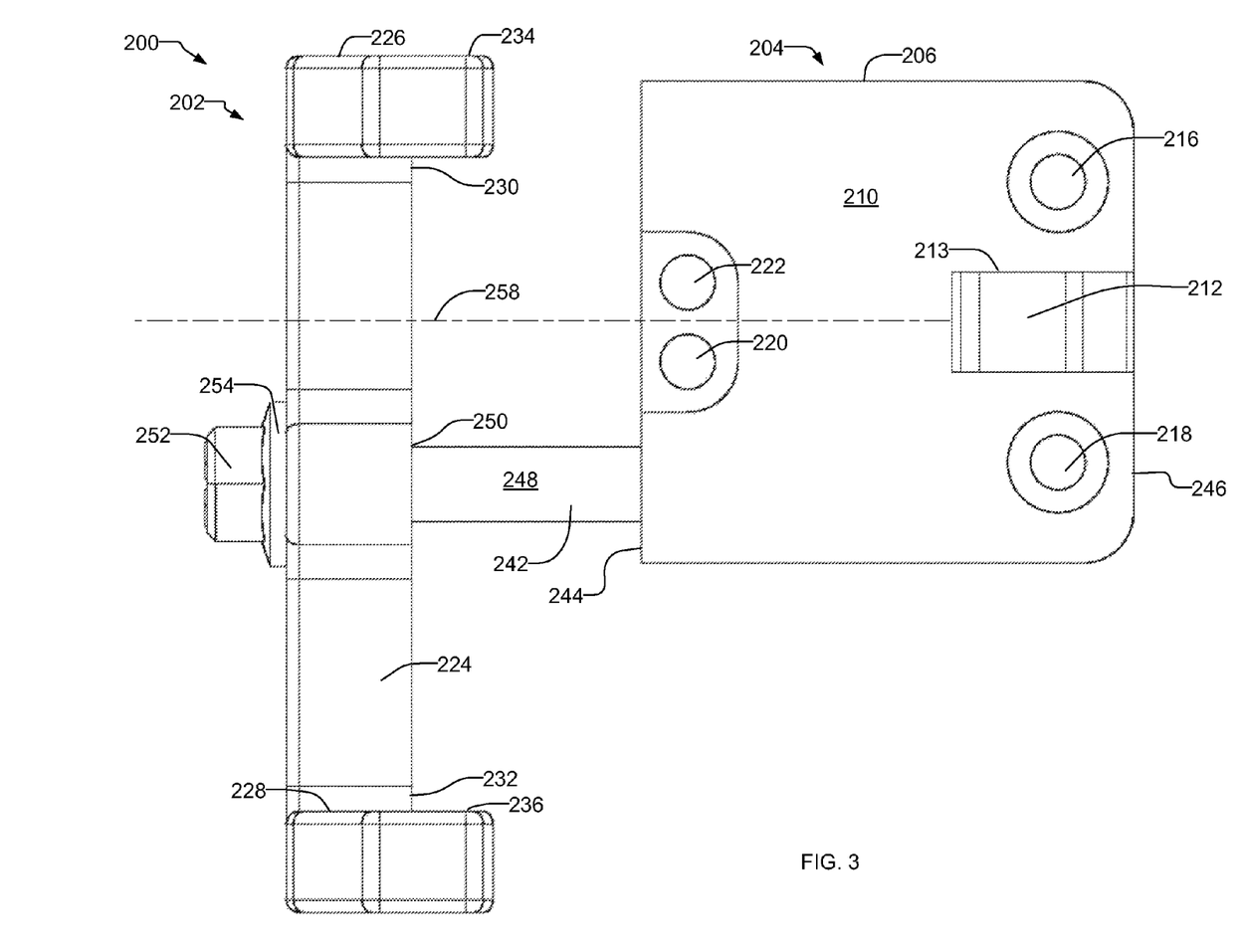
FIG. 3 is a plan view of the example apparatus of FIG. 2.
Figure 4:
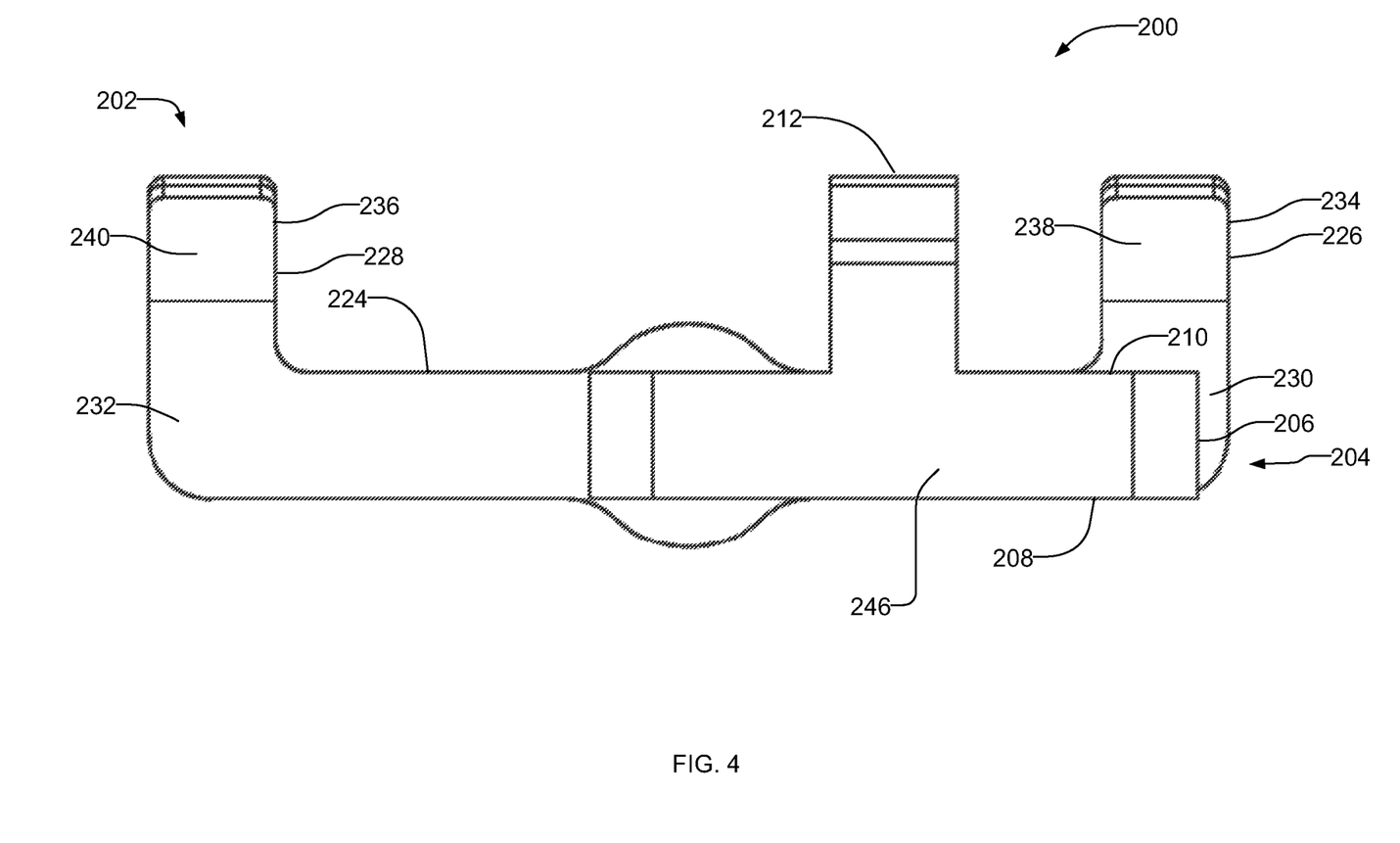
FIG. 4 is an end view of the example apparatus of FIG. 2.
Figure 5:
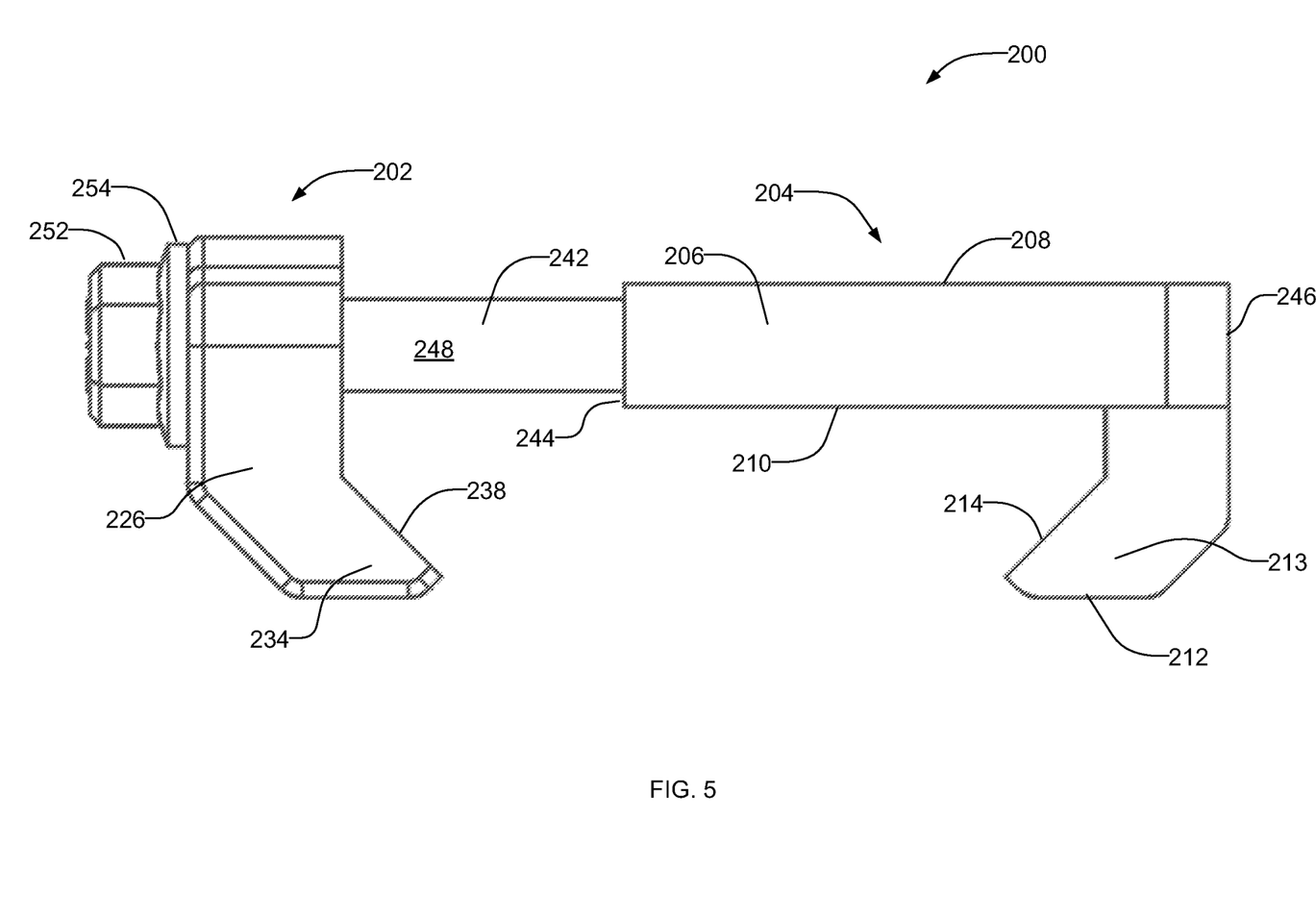
FIG. 5 is side view of the example apparatus of FIG. 2.

FIG. 2 is an isometric view of an example apparatus 200 to mount process control devices to an actuator, FIG. 3 is a plan view of the example apparatus 200 of FIG. 2, FIG. 4 is an end view of the example apparatus 200 of FIG. 2, and FIG. 5 is side view of the example apparatus 200 of FIG. 2. Referring to FIGS. 2-5, the example apparatus 200 is generally configured as a process control device mounting bracket having opposed sliding jaws or clamps 202 and 204, which can be easily securely attached to, for example, a yoke (e.g., a leg of the yoke) or other elongated support member (e.g., a support rod) of an actuator as depicted and described in more detail in connection with FIG. 6 below.

Figure 6:
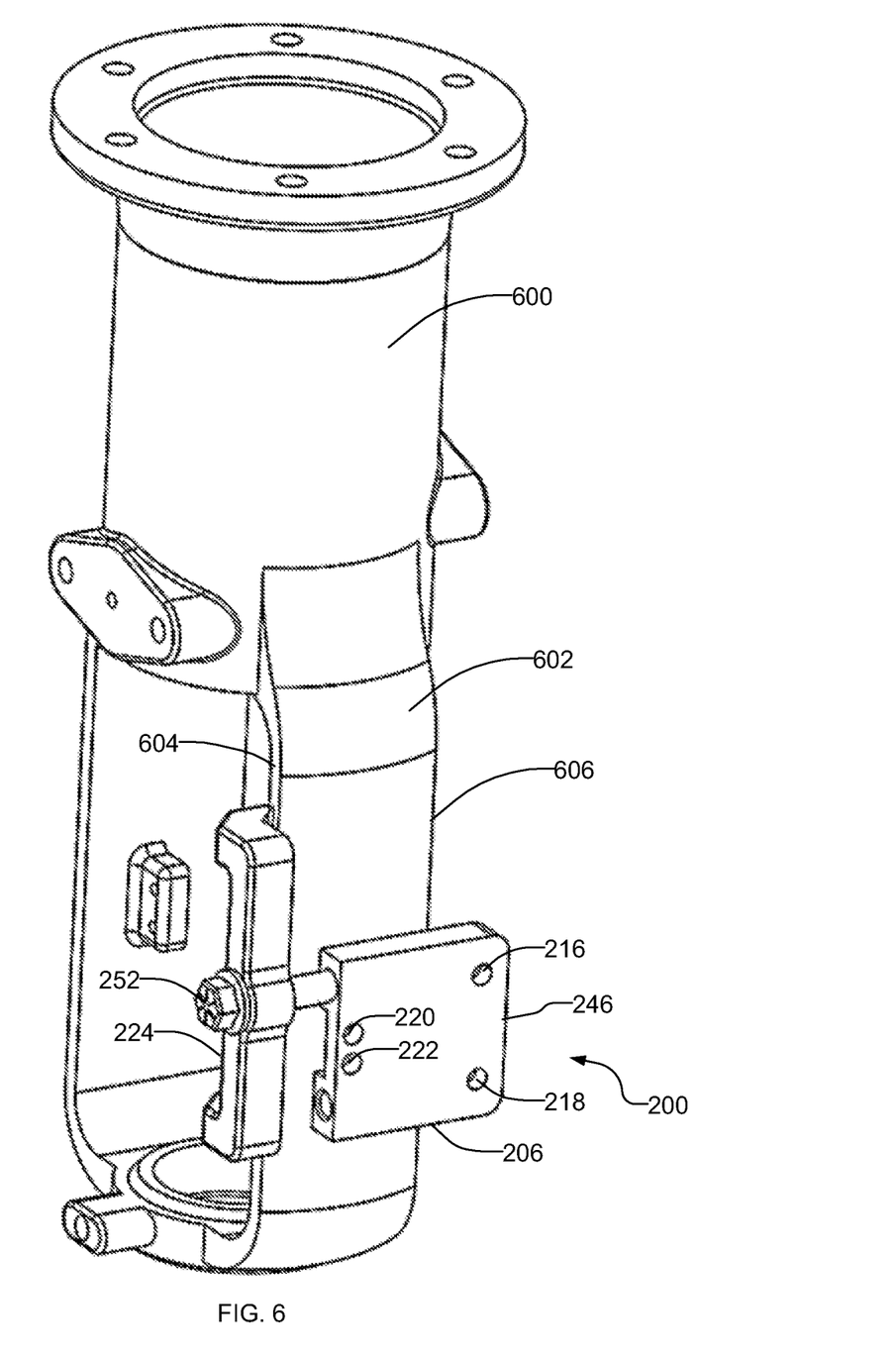
FIG. 6 depicts an example manner in which the example apparatus of FIG. 2 may be coupled to an actuator.

The jaw or clamp 204 provides a mounting plate 206 having a first side 208 to receive a process control device and a second side 210 opposite the first side 208. The second side 210 includes a clamping finger or lug 212 that extends away from the second side 210 and which is configured to engage a lateral edge or surface of an actuator yoke, leg or other elongated support member as shown in FIG. 6. The clamping finger or lug 212 provides a wedge-shaped portion 213 having an angled surface 214 to facilitate the engagement of the clamping finger or lug 212 with the lateral edge or surface of the actuator yoke, leg or other elongated support member. Additionally, the angled surface 214 causes the mounting plate 206 to be drawn toward and into tight engagement with the actuator yoke or other elongated support member as the clamps or jaws 202 and 204 are drawn toward each other. While a particular wedge-shaped portion and angled surface are depicted in FIG. 2, any other geometric shapes and/or angled or curved surfaces could be used to achieve similar or identical results.

The mounting plate 206 further includes a plurality of apertures 216, 218, 220 and 222, which may be configured to mountably receive a plurality of different types of process control devices against the surface of the first side 208 of the mounting plate 206. The apertures 216, 218, 220 and 222 may be sized and configured to receive any variety of process control devices such as positioners, volume boosters, etc.

The jaw or clamp 202 is configured as an elongated body or clamp arm 224 having second and third clamping fingers or lugs 226 and 228 adjacent respective ends 230 and 232 of the elongated clamp arm 224. Each of the second and third clamping fingers or lugs 226 and 228 is configured to engage another lateral edge or surface of the actuator yoke or elongated support member opposite the lateral edge or surface engaged by the first clamping finger or lug 212. The clamping fingers or lugs 226 and 228 have respective wedge-shaped portions 234 and 236 and angled surfaces 238 and 240, which are similarly or identically configured to the wedge-shaped portion 213 and angled surface 214 to cause the elongated clamp arm 224 to be drawn into tight engagement with the yoke or other elongated support member of the actuator as the clamps or jaws 202 and 204 are drawn toward each other.

The clamps or jaws 202 and 204 and, more particularly, the elongated clamp arm 224 and the mounting plate 206 are slidably coupled to each other via an adjustable fastener 242. In the example depicted, the adjustable fastener 242 is a bolt having a threaded end (not shown) that threadably engages an aperture in an edge or end 244 of the mounting plate 206 opposite an edge or end 246, which is adjacent the clamping finger or lug 212. A shaft 248 of the fastener 242 passes through an aperture 250 of the elongated clamp arm 224. The adjustable fastener 242 may include a hex-shaped head 252 or the like to facilitate the use of a socket wrench or other tool to rotate the adjustable fastener 242 and, thus, the movement or adjustment of the jaws 202 and 204. In particular, the fastener 242 may be rotated to cause the elongated clamp arm 224 and the mounting plate 206 to move toward each other to fix the mounting plate 206 relative to an actuator yoke or other elongated support member, or away from each other to remove the mounting plate 206 from the actuator. More specifically, to install or fix the mounting plate 206 on the actuator, the adjustable fastener 242 may be rotated or tightened to cause the mounting plate 206 and the elongated clamp arm 224 to slide toward each other so that the clamping fingers or lugs 212, 226 and 228 engage the respective lateral edges or surfaces of the actuator yoke or elongated support member to fix the mounting plate relative to the yoke or elongated support member. To spread the load applied by the head 252 of the fastener 242, an integral washer 254 may be provided. Alternatively, the washer 254 may be a split-ring lock washer, a wave washer, etc. to substantially inhibit or prevent the fastener 242 from loosening (e.g., due to vibration) after the apparatus 200 is attached to an actuator.

In the example of FIGS. 2-5, the second and third clamping fingers or lugs 234 and 236 are disposed on a longitudinal axis 256 of the elongated clamp arm 224 and the first clamping finger or lug 212 is spaced from the second and third fingers or lugs 234 and 236 and the longitudinal axis 256 of the elongated clamp arm 224. While the example apparatus 200 depicts the clamping fingers or lugs 234 and 236 as being located adjacent or at the ends 230 and 232, one or both of the clamping fingers or lugs 234 and 236 could be located along the longitudinal axis 256 of the clamp arm 224 closer to the aperture 250. Additionally, while the first clamping finger or lug 212 is depicted as being located adjacent the edge 246 and slidably movable with the mounting plate 206 along an axis 258 that lies between the second and third clamping fingers or lugs 234 and 236, the first clamping finger or lug 212 could alternatively be positioned in other locations extending away from the second side 210 of the mounting plate 206. For example, the first clamping finger or lug 212 could be located closer to the edge 244 and/or may be positioned laterally displaced from the axis 258 depicted in FIG. 2.

Additionally, while the clamping fingers or lugs 212, 234 and 236 are described as engaging lateral edges or surfaces of an actuator yoke or elongated support member, such lateral edges or surfaces can be any side edges in any orientation between and including vertical and horizontal orientations. Furthermore, more generally, the clamping fingers or lugs 212, 234 and 236 can be used engage any opposing edges or surfaces (e.g., edges or surfaces facing in opposite or different directions to contact the clamping fingers or lugs) that may or may not be considered lateral edges or surfaces.

Also, while the example apparatus depicts only one fastener, multiple similar or identical fasteners may be used instead. In particular, the elongated clamp arm 224 may include another aperture similar to the aperture 250 spaced from the aperture 250 along the axis 256. Another fastener (e.g., a threaded bolt) similar to the fastener 242 may then be passed through the additional aperture and into another threaded aperture in the end or edge 244 of the mounting block 206. Additionally, the various components of the example apparatus 200 may be made partially and/or completely of one or more metals, plastics, etc. to suit the needs of a particular application.

FIG. 6 depicts an example manner in which the example apparatus 200 of FIGS. 2-5 may be coupled to an actuator yoke 600. In particular, in FIG. 6, the example apparatus 200 is depicted as being mounted or fixed to a leg 602 of the yoke 600. To install the example apparatus 200, the fastener 242 may be rotated (e.g., counter-clockwise) sufficiently to enable the angled surfaces 214, 238 and 240 of the clamping fingers or lugs 212, 234 and 236 to be spaced from opposing lateral edges 604 and 606 of the leg 602 of the yoke 600. The fastener 242 may then be rotated or tightened (e.g., by rotating it clockwise) to cause the mounting plate 206 and the elongated clamp arm 224 to move toward each other. As the fastener 242 is tightened, the angled surfaces 238 and 240 of the elongated clamp arm 224 engage the lateral edge 604 and the angled surface 214 engages the lateral edge 606 to laterally grip the leg 606 and to pull the mounting plate 206 toward the leg 606. A process control device (not shown) can then be attached to the mounting plate 206 via one or more of the apertures 216, 218, 220 and 222.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to mount a process control device to an actuator yoke, the process control device to control a valve to manipulate a flow of fluid, comprising:
   a mounting plate having a first side to mountably receive the process control device and a second side opposite the first side, the second side having a first clamping finger extending away from the second side and configured to engage a first edge of the actuator yoke;
   an elongated clamp arm having second and third clamping fingers adjacent respective ends of the elongated clamp arm, each of the second and third clamping fingers configured to engage a second edge of the actuator yoke opposite the first edge, the elongated clamp arm slidably coupled to the mounting plate; and
   a fastener adjustable to cause the elongated clamp arm and the mounting plate to slide toward each other along a longitudinal axis of the fastener so that the first, second and third clamping fingers engage the respective edges of the yoke to fix the mounting plate relative to the yoke, the fastener having a longitudinal axis extending between the second and third clamping fingers and offset relative to the first clamping finger, the first clamping finger oriented toward the second and third clamping fingers, the first clamping finger being in offset alignment with the second and third clamping fingers relative to the longitudinal axis of the fastener.

2. The apparatus of claim 1, wherein the mounting plate comprises apertures to mountably receive the process control device.

3. The apparatus of claim 2, wherein the apertures are configured to receive a plurality of different types of process control devices.

4. The apparatus of claim 1, wherein at least one of the clamping fingers has an angled surface to engage one of the edges of the yoke.

5. The apparatus of claim 4, wherein the at least one angled surface is configured to cause the mounting plate and the clamp arm to be drawn toward the actuator yoke as the fastener is tightened.

6. The apparatus of claim 1, wherein the fastener comprises a threaded bolt.

7. The apparatus of claim 6, wherein the threaded bolt passes through an aperture in the clamp arm and into a threaded aperture in an edge of the mounting plate opposite an edge adjacent the first clamping finger.

8. The apparatus of claim 6, wherein the fastener comprises a second threaded bolt.

9. The apparatus of claim 1, wherein the second and third clamping fingers are disposed on a longitudinal axis of the clamp arm, and wherein the first clamping finger is spaced from the second and third fingers and the longitudinal axis of the clamp arm.

10. The apparatus of claim 1, wherein the longitudinal axis of the fastener passes through the clamp arm at a midpoint between the second and third clamping fingers.

11. The apparatus of claim 1, wherein rotation of the fastener in a first direction causes the first, second and third clamping fingers to move relative to each other in a direction along the longitudinal axis of the fastener as the fastener is rotated in the first direction.

12. The apparatus of claim 1, wherein the fastener includes a shaft, and wherein rotation of the fastener causes the second and third clamping fingers to simultaneously move along the shaft.

13. The apparatus of claim 1, wherein the mounting plate includes a peripheral edge defining the first side of the mounting plate, the peripheral edge having a face that includes an aperture to receive the fastener.

14. The apparatus of claim 13, wherein the aperture of the peripheral edge is offset relative to a midpoint of the peripheral edge.

15. The apparatus of claim 13, wherein the face of the peripheral edge of the mounting plate is substantially perpendicular to the second side of the mounting plate.

16. The apparatus of claim 1, wherein the first clamping finger extends in a direction substantially perpendicular relative to the second side of the mounting plate.

17. The apparatus of claim 1, wherein the second and third clamping fingers extend in a direction substantially perpendicular relative to the second side of the mounting plate.

18. The apparatus of claim 1, wherein the first side is configured to mountably receive the process control device against a surface of the first side.

19. The apparatus of claim 18, wherein the first side of the mounting plate includes a plurality of apertures that receive a plurality of fasteners to mount the process control device to the mounting plate.

20. An apparatus to mount a process control device to an actuator yoke, the process control device to control a valve to manipulate a flow of fluid, comprising:
   a mounting plate having a first side to mountably receive the process control device and a second side opposite the first side, the second side having a first clamping finger extending away from the second side and configured to engage a first edge of the actuator yoke;
   an elongated clamp arm having second and third clamping fingers adjacent respective ends of the elongated clamp arm, each of the second and third clamping fingers configured to engage a second edge of the actuator yoke opposite the first edge, the elongated clamp arm slidably coupled to the mounting plate; and
   a fastener adjustable to cause the elongated clamp arm and the mounting plate to slide toward each other so that the first, second and third clamping fingers engage the respective edges of the yoke to fix the mounting plate relative to the yoke, the fastener having a longitudinal axis extending between the second and third clamping fingers and offset relative to the first clamping finger, wherein each of the clamping fingers has a respective angled surface, and wherein the angled surface of the first clamping finger faces the angled surfaces of the second and third clamping fingers.

21. An apparatus comprising:
   an actuator mechanically coupled to a valve for controlling a flow of fluid, the actuator having first and second lateral surfaces;

a mounting plate having a plurality of peripheral edges defining a first side of the mounting plate to receive a device, the mounting plate having a first lug extending away from a surface of the mounting plate, the first lug configured to engage a first surface of an elongated support member of the actuator, and at least one of the plurality of peripheral edges configured to receive a shaft; and a clamp arm slidably coupled to the mounting plate via the shaft, the clamp arm having an aperture to the receive the shaft and at least a second lug extending away from a body of the clamp arm and the surface of the mounting plate, wherein the second lug is configured to engage a second surface of the elongated support member opposite the first surface to fix the clamp arm and the mounting plate to the actuator, wherein the clamp arm comprises a third lug spaced from the second lug along a longitudinal axis of the clamp arm, the third lug extending away from the body of the clamp arm and the surface of the mounting plate, and the third lug being configured to engage the second surface of the elongated support member.

22. The apparatus of claim 21, wherein the body of the clamp arm comprises an elongated portion having first and second ends, wherein the second lug is adjacent the first end and the third lug is adjacent the second end, and wherein the first lug is to slidably move with the mounting plate along an axis that lies between the second and third lugs.

23. The apparatus of claim 21, further comprising an adjuster to move the clamp arm toward the mounting plate to fix the mounting plate and the clamp arm to the elongated support member.

24. An apparatus comprising:
an actuator mechanically coupled to a valve for controlling a flow of fluid, the actuator having first and second lateral surfaces;
a mounting plate having a plurality of peripheral edges defining a first side of the mounting plate to receive a device, the mounting plate having a first lug extending away from a surface of the mounting plate, the first lug configured to engage a first surface of an elongated support member of the actuator, and at least one of the plurality of peripheral edges configured to receive a shaft; and
a clamp arm slidably coupled to the mounting plate via the shaft, the clamp arm having an aperture to the receive the shaft and at least a second lug extending away from a body of the clamp arm and the surface of the mounting plate, wherein the second lug is configured to engage a second surface of the elongated support member opposite the first surface to fix the clamp arm and the mounting plate to the actuator, wherein the shaft comprises a threaded bolt to be rotated to cause the clamp arm and the mounting plate to slide toward each other.

25. The apparatus of claim 24, further comprising an adjuster to move the clamp arm toward the mounting plate to fix the mounting plate and the clamp arm to the elongated support member.

26. An apparatus comprising:
an actuator mechanically coupled to a valve for controlling a flow of fluid, the actuator having first and second lateral surfaces;
a mounting plate having a plurality of peripheral edges defining a first side of the mounting plate to receive a device, the mounting plate having a first lug extending away from a surface of the mounting plate, the first lug configured to engage a first surface of an elongated support member of the actuator, and at least one of the plurality of peripheral edges configured to receive a shaft; and
a clamp arm slidably coupled to the mounting plate via the shaft, the clamp arm having an aperture to the receive the shaft and at least a second lug extending away from a body of the clamp arm and the surface of the mounting plate, wherein the second lug is configured to engage a second surface of the elongated support member opposite the first surface to fix the clamp arm and the mounting plate to the actuator, wherein each of the lugs comprises a respective angled surface to engage the surfaces of the elongated support member so that the mounting plate is drawn toward the elongated support member of the actuator as the clamp arm and the mounting plate slidably move toward each other.

27. The apparatus of claim 26, further comprising an adjuster to move the clamp arm toward the mounting plate to fix the mounting plate and the clamp arm to the elongated support member.

* * * * *

UNITED STATES PATENT AND TRADEMARK OFFICE
CERTIFICATE OF CORRECTION

PATENT NO. : 8,864,104 B2  
APPLICATION NO. : 12/388290  
DATED : October 21, 2014  
INVENTOR(S) : Ben Koch and Brian Burlage Page 1 of 1

It is certified that error appears in the above-identified patent and that said Letters Patent is hereby corrected as shown below:

In the Claims

Column 7, line 10 (Claim 21) remove "the" between "to" and "receive"

Column 8, line 2 (Claim 24) remove "the" between "to" and "receive"

Column 8, line 28 (Claim 26) remove "the" between "to" and "receive"

Signed and Sealed this
Third Day of March, 2015

Michelle K. Lee
*Deputy Director of the United States Patent and Trademark Office*